(12) United States Patent
Miura

(10) Patent No.: US 7,170,613 B2
(45) Date of Patent: Jan. 30, 2007

(54) SURFACE INSPECTING APPARATUS THAT DETERMINES AN EDGE POSITION OF AN OBJECT

(75) Inventor: Takahiro Miura, Aichi (JP)

(73) Assignee: Nidek Co., Ltd., Aichi (JP)

( * ) Notice: Subject to any disclaimer, the term of this patent is extended or adjusted under 35 U.S.C. 154(b) by 459 days.

(21) Appl. No.: 10/697,314

(22) Filed: Oct. 31, 2003

(65) Prior Publication Data
US 2004/0160610 A1 Aug. 19, 2004

(30) Foreign Application Priority Data
Oct. 31, 2002 (JP) ............. P2002-318560

(51) Int. Cl.
G01B 9/02 (2006.01)

(52) U.S. Cl. .................................... 356/512

(58) Field of Classification Search ......... 356/401, 356/489, 495, 508, 511–514, 614, 559.22, 356/559.29, 559.3, 559.36; 250/559.22, 250/559.29, 559.36, 559.3
See application file for complete search history.

(56) References Cited

U.S. PATENT DOCUMENTS
4,887,904 A * 12/1989 Nakazato et al. ........... 356/621
2004/0160609 A1* 8/2004 Ohsawa et al. ............. 356/512

FOREIGN PATENT DOCUMENTS
JP 10-221033 A 8/1998

\* cited by examiner

Primary Examiner—Gregory J. Toatley, Jr.
Assistant Examiner—Marissa J. Detschel
(74) Attorney, Agent, or Firm—Sughrue Mion, PLLC

(57) ABSTRACT

A surface inspecting apparatus for inspecting a shape of a surface of an object to be inspected is disclosed. The surface inspecting apparatus includes a mounting base for mounting the object, a positioning device for positioning the object to an inspecting position on the mounting base, a memory for storing position specifying information for specifying a two-dimensional position of the object when the object is positioned, an inputting device for inputting an outer shape data of the object, and edge position determining device for acquiring an edge position of the object based on the stored position specifying information and the inputted outer shape data.

10 Claims, 5 Drawing Sheets

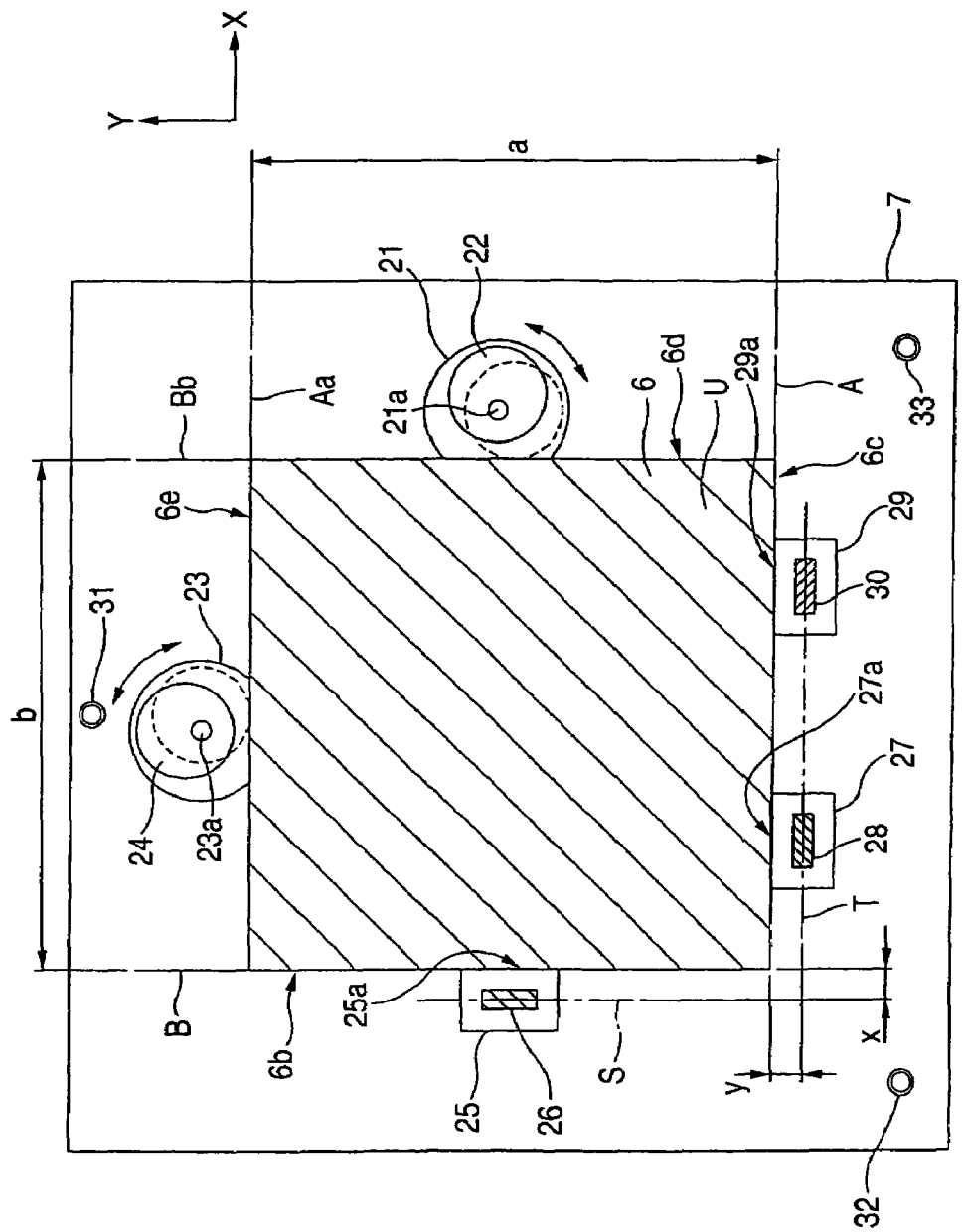

SURFACE INSPECTING APPARATUS THAT DETERMINES AN EDGE POSITION OF AN OBJECT

BACKGROUND OF THE INVENTION

The present invention relates to a surface inspecting apparatus for inspecting a surface shape of an object to be inspected.

In a thin plate such as a semiconductor wafer, an optical disk, a magnetic disk or the like, a surface shape (flatness of surface etc.) effects significant influence on quality. Further, a rapid change in a surface shape is liable to emerge at an edge portion of a thin plate. Hence, when a surface shape of the thin plate which is an object to be inspected is inspected by an interference fringe, or the like, it is requested to accurately grasp an edge position of the shin plate.

SUMMARY OF THE INVENTION

In view of the above-described problem of the related art, it is a technical object of the invention to provide a surface inspecting apparatus capable of inspecting a surface shape with high accuracy by accurately grasping an edge position of an object to be inspected.

In order to resolve the above-described problem, it is a characteristic of the invention to provide the following constitution.

(1) A surface inspecting apparatus for inspecting a shape of a surface to be inspected of an object to be inspected comprising:

a mounting base on which the object is mounted;

positioning means for positioning the object to an inspecting position on the mounting base;

a memory which stores position specifying information for specifying a two-dimensional position of the object when the object is positioned;

inputting means for inputting an outer shape data of the object; and edge position determining means for determining an edge position of the object based on the stored position specifying information and the inputted outer shape data.

(2) The surface inspecting apparatus according to (1), wherein the positioning means includes a guide member attached to the mounting base, with which the object is positioned to the inspecting position by being brought into contact with an edge of the object, and wherein the memory stores the position specifying information for specifying the two-dimensional position of the object when the edge of the object is brought into contact with the guide member.

(3) The surface inspecting apparatus according to (2), further comprising:

an image taking unit which takes an image of a mark provided for a predetermined position with respect to the guide member; and reference position determining means for determining a reference position by processing the taken image including the image of the mark;

wherein the memory stores the determined reference position information as the position specifying information.

(4) The surface inspecting apparatus according to (3), wherein the image taking unit takes an image of an interference fringe formed by the inspected surface of the positioned object and a reference surface.

(5) The surface inspecting apparatus according to (1), further comprising:

existing region determining means for determining an existing region of the object based on the determined edge position.

(6) The surface inspecting apparatus according to (1), further comprising:

analyzing means for determining a three-dimensional shape of the surface of the object; and outputting means for outputting information of a positional relationship between the determined edge position and an analyzing region of the analyzing means.

(7) The surface inspecting apparatus according to (1), further comprising:

analyzing means for determining a three-dimensional shape of the surface of the object;

effective region determining means for determining an effective region achieving a predetermined inspection accuracy from a result of analysis by the analyzing means; and outputting means for outputting information of a positional relationship between the determined edge position and the determined effective region.

(8) A surface inspecting apparatus for inspecting a shape of a surface to be inspected of an object to be inspected comprising:

a mounting base on which the object is mounted;

a guide member with which the object is positioned to an inspecting position on the mounting base by being brought into contact with an edge of the object;

a mark provided for a predetermined position with respect to the guide member;

an image taking unit which takes an image of an interference fringe formed by the inspected surface of the positioned object and a reference surface, and an image of the mark;

analyzing means for determining a three-dimensional shape of the surface of the object based on the taken image of the interference fringe;

reference position determining means for determining a reference position by processing the taken image including the image of the mark;

inputting means for inputting an outer shape data of the object; and edge position determining means for determining an edge position of the object based on the determined reference position information and the inputted outer shape data.

(9) The surface inspecting apparatus according to (8), further comprising:

outputting means for outputting information on a positional relationship between the determined edge position and an analyzing region of the analyzing means.

(10) The surface inspecting apparatus according to (8), further comprising:

effective region determining means for determining an effective region achieving a predetermined inspection accuracy from a result of analysis by the analyzing means; and outputting means for outputting information of a positional relationship between the determined edge position and the determined effective region.

BRIEF DESCRIPTION OF THE DRAWINGS

FIG. 2 is a view showing a guide mechanism of a glass plate to be inspected.

DESCRIPTION OF PREFERRED EMBODIMENTS

Figure 1:
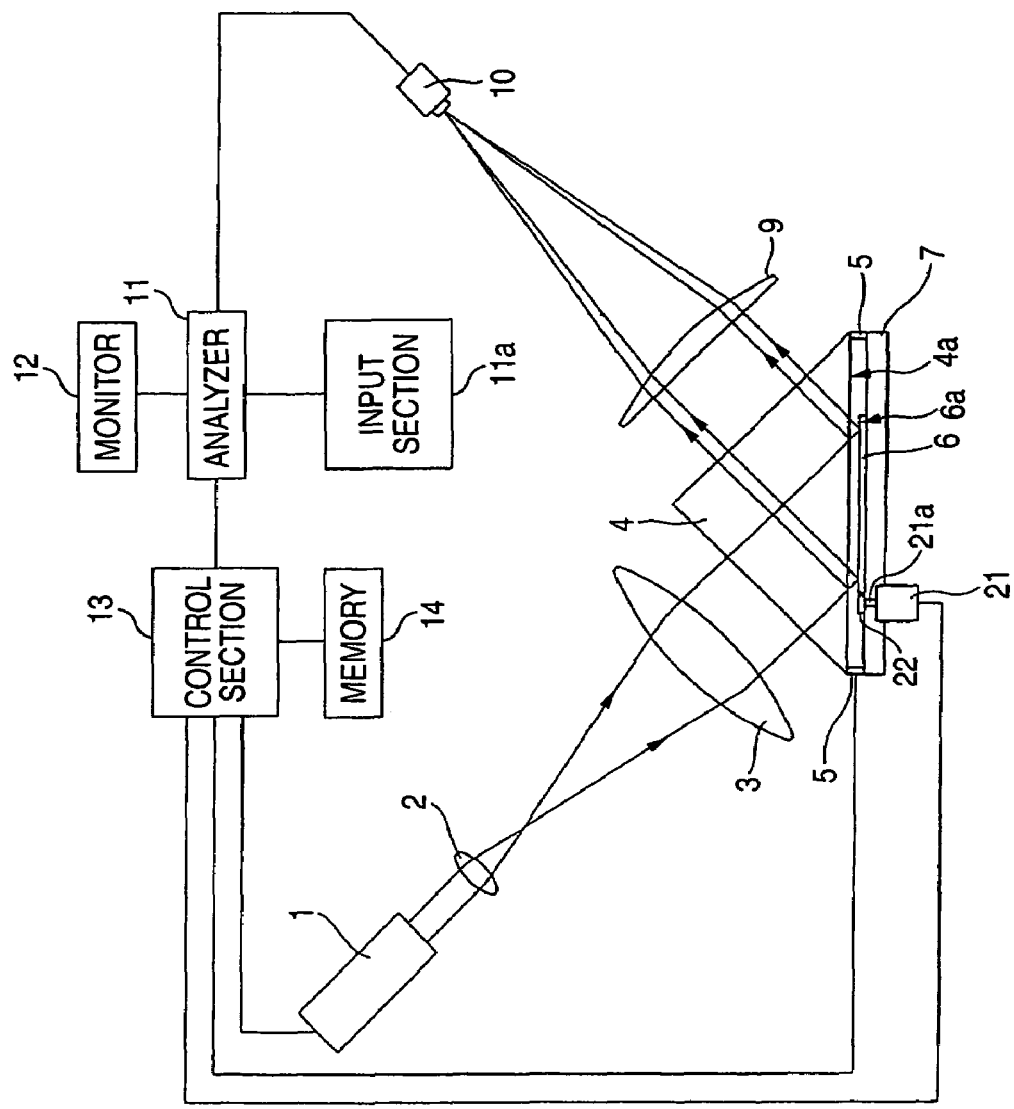
FIG. 1 is an outline constitution view of essential portions of an inspecting optical system and a control system of a surface inspecting apparatus.

An embodiment according to the invention will be described below with reference to the drawings. FIG. 1 is a view showing the schematic structure of the main parts of an inspecting optical system and a control system in a surface inspecting apparatus according to the invention. An oblique incidence interferometer is illustrated. A laser beam for an inspection which is emitted from an He—Ne laser beam source 1 as an inspecting light source passes through an expander lens 2 and is then changed into a parallel luminous flux by a collimator lens 3 and the parallel luminous flux is thereafter incident on a prism 4. A part of the laser beam incident on the prism 4 is transmitted through a reference plane 4a and is reflected by a plane 6a to be inspected in a glass plate 6 to be inspected which is supported on a mounting base 7, and passes through the prism 4 again and is transmitted through a lens 9 toward a camera 10. Further, another part of the laser beam incident on the prism 4 is reflected by the reference plane 4a and passes through the lens 9 toward the camera 10. The camera 10 picks up the image of an interference fringe formed by a laser beam reflected by the plane 6a and a laser beam reflected by the reference plane 4a. The image of the interference fringe thus picked up is input as a video signal to an analyzer 11. The analyzer 11 carries out an arithmetic analysis for the shape of a surface based on the input signal.

Incidentally, an input section 11a such as a keyboard, a mouse, an inspection start switch and the like, a monitor 12 for displaying the picked-up image and a result of the analysis and a control section 13 are connected to the analyzer 11. The control section 13 controls the driving operations of the laser beam source 1, the motor for positioning, a piezo unit 5 and the like. The prism 4 is moved by the piezo unit 5 to change a distance between the reference plane 4a and the plane 6a so that the phase of a reference beam is varied in eight steps. Moreover, a memory 14 is connected to the control section 13.

The glass plate 6 is placed on the mounting base 7 as shown by FIG. 2. Numeral 25 designates a guide for positioning an edge 6b of the glass plate 6 at a reference position in X direction, and a mark 26 in a linear shape extending in Y direction is applied to the guide 25 by etching. Numerals 27 and 29 designate guides for positioning an edge 6c of the glass plate 6 at a reference position in Y direction and marks 28 and 30 in a linear shape extended in X direction similar to the mark 26 are applied to the guides 27 and 29. Further, the mounting base 7 and the guides 25, 27 and 29 are designed such that heights of surfaces of the marks 26, 28 and 30 applied to the guides 25, 27 and 29 and a height of a surface of the glass plate 6 are equal to each other.

Numerals 22 and 24 designate eccentric cams which are respectively fixed to a shaft 21a of a motor 21 and a shaft 23a of a motor 23. The control section 13 rotates the cam 22 by driving and rotating the motor 21 and positions the glass plate 6 in X direction by pressing the glass plate 6 (edge 6b) to the guide 25. Similarly, the control section 13 rotates the cam 24 by driving and rotating the motor 23 and positions the glass plate 6 in Y direction by pressing the glass plate 6 (edge 6c) to the guides 27 and 29.

Numerals 31, 32 and 33 are adjusting screws for adjusting relative positions and a relative angle of the mounting base 7 and the reference surface 4a of the prism 4.

In the surface inspecting apparatus having the above-described constitution, operation thereof will be described as follows. First, dimension (size) data (a×b) of an outer shape of the glass plate 6 is inputted through the input section 11a. The dimension data of the outer shape of the plate glass 6 is provided as a design value or a measured value. The control section 13 stores the inputted dimension data of the outer shape to the memory 14.

Next, when a positioning switch of the input section 11a is depressed after mounting the glass plate 6 on the mounting base 7, the control section 13 drives and rotates the motors 21 and 22 to respectively press the cams 22 and 24 to the edges 6d and 6e of the glass plate 6. Thereby, the edges 6b and 6c of the glass plate 6 are respectively brought into contact with the guides 25, 27 and 29 and the glass plate 6 is placed at a predetermined inspecting position. Thereafter, the control section 13 drives and rotates the motors 21 and 23 in the reverse direction to thereby nullify press force by the cams 22 and 24. Inspection in a natural state in which the glass plate 6 is not exerted with external force can be carried out.

After positioning of the glass plate 6 has been finished, an image of the interference fringe formed by a laser beam reflected by the reference surface 4a, the surface 6a and surfaces of the guides 25, 27 and 29 is taken by the camera 10 and the image of the interference fridge is displayed on the monitor 12. Further, the relative positions and relative angles of the surfaces of the guides 25, 27 and 29 and the reference surface 4a are adjusted by rotating the adjusting screws 31, 32 and 33 such that the image of the interference fringe of the guides 25, 27 and 29 attached with the marks 26, 28 and 30 is displayed clearly. Thereafter, when a mark measuring switch of the input section 11a is depressed, images of the marks 26, 28 and 30 on the guides 25, 27 and 29 are taken and based on positions of the marks 26, 28 and 30 acquired by processing the images, reference lines (reference positions) A and B are determined and stored to the memory 14 by the control section 13 as information for specifying a two-dimensional position of the glass plate 6.

Figure 3A:
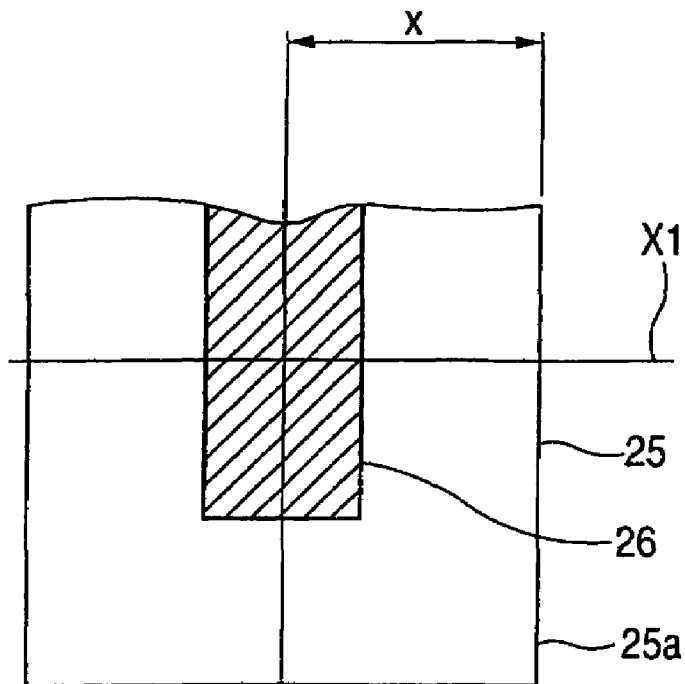
FIGS. 3A and 3B illustrates views showing a way of determining a reference position (reference line).
Figure 3B:
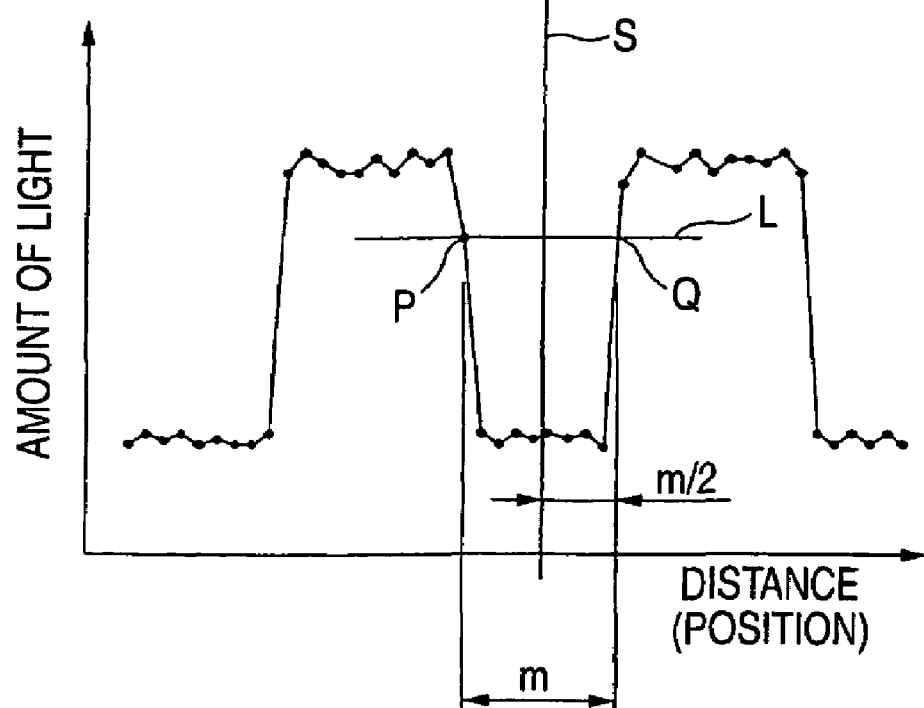

The reference lines A and B are determined as follows. As shown by FIG. 3A, an amount of light on a scanning line X1 acquired by taking the image of the mark 26 on the guide 25 is accumulated by an amount of eight steps. According to a distribution of the accumulated amount of light, as shown by FIG. 3B, the amount of light at a portion of the mark 25 is reduced and increased at other portion. In FIG. 3B, a line L horizontally traversing a portion of a valley of the amount of light of the mark 25 is drawn and intersections of the line L and the distribution of the amount of light are designated by notations P and Q. Next, when a length of a line segment PQ is designated by notation m, a portion of m/2 is set to a center line S in a length direction of the mark 26. A distance x between the center line S and an edge 25a of the guide 25 has previously been obtained and stored to the memory 14. Meanwhile, similarly with regard to the marks 28 and 30, a distance y between a center line T and an edge 27a of the guide 27 (or an edge 29a of the guide 29) has previously been obtained and stored to the memory 14. The control section 13 sets a position offset from the center line S by the distance x as the reference line B in x direction, and sets a position offset from the center line T by the distance y as the reference line A in Y direction to respectively store to the memory 14 as information for specifying the two-dimensional position of the glass plate 6.

Next, based on the dimension data (a×b) of the outer shape of the glass plate 6 inputted from the input section 11a, the control section 13 sets a line remote from the reference line B by the dimension of b and in parallel with the reference line B as a reference line Bb. Similarly, a line remote from the reference line A by the dimension of a and in parallel with the reference line A is set as a reference line Aa. Further, the control section B sets positions of the reference lines B, A, Bb, and Aa in the photographed image respectively as edge positions of the edges 6b, 6c, 6d and 6e and sets a region surrounded by the reference lines B-A-Bb-Aa as an existing region U of the glass plate 6.

Next, the relative positions and the relative angle of the surface 6a of the glass plate 6 and the reference surface 4a are adjusted by rotating the adjusting screws 31, 32 and 33 such that the image of the interference fringe of the glass plate 6 is excellently displayed. Thereafter, when the inspection start switch of the input section 11a is depressed, the control section 13 changes the phase of the interference fringe by changing a distance between the reference surface 4a and the surface 6a by applying voltage to the piezo unit 5. According to the apparatus, a number of phase shift is constituted by eight steps. In this way, the image of the interference fringe the phase of which is changed is taken by the camera 10 and respective image data is inputted to a memory at inside of the analyzer 11.

The analyzer 11 determines an analyzing region by a threshold processing after acquiring a contrast image by subjecting the plurality of images of the interference fringe having different phases inputted to the memory to well-known processings of removing noise and the like. Further, by converting the phase data of the image of the interference fringe into height data, a three-dimensional shape of the surface 6a is acquired. By the three-dimensional shape provided in the analyzing region, the edge positions of the glass plate 6 can accurately be known and the surface shape information can be acquired with high accuracy. Further, the three-dimensional shape is related to at which position of the existing region U the three-dimensional shape is disposed and displayed on the monitor 12 by a perspective view, a contour view or the like. Thereby, the flatness of the surface 6a can be evaluated based on the edge positions.

Incidentally, although according to the embodiment, the dimension data (a×b) of the outer shape of the glass plate 6 is inputted from the input section 11a, the motors 21 and 23 may be attached with encoders and the dimension data of the outer shape of the glass plate 6 maybe measured from rotational angles of the cams 22 and 24 to input it.

Further, although according to the above-described embodiment, in order to acquire the edge positions of the glass plate 6, the images of the marks 26, 28 and 30 on the guides 25, 27 and 29 are taken, the positions may be acquired by other method. For example, lines in a shape of a cross orthogonal to each other in XY directions or the like are applied onto a surface of other than a peripheral portion of a reference glass plate having a shape the same as that of the glass plate 6, an image of an interference fringe of the cross lines is taken previously before inspecting the glass plate 6 and positions of the cross lines are calculated by subjecting the image to image processing. Then, based on distances from the edges of the cross lines which have been acquired previously, the reference lines A and B are determined as information for specifying the two-dimensional position of the glass plate 6 to store to the memory 14.

Figure 4:
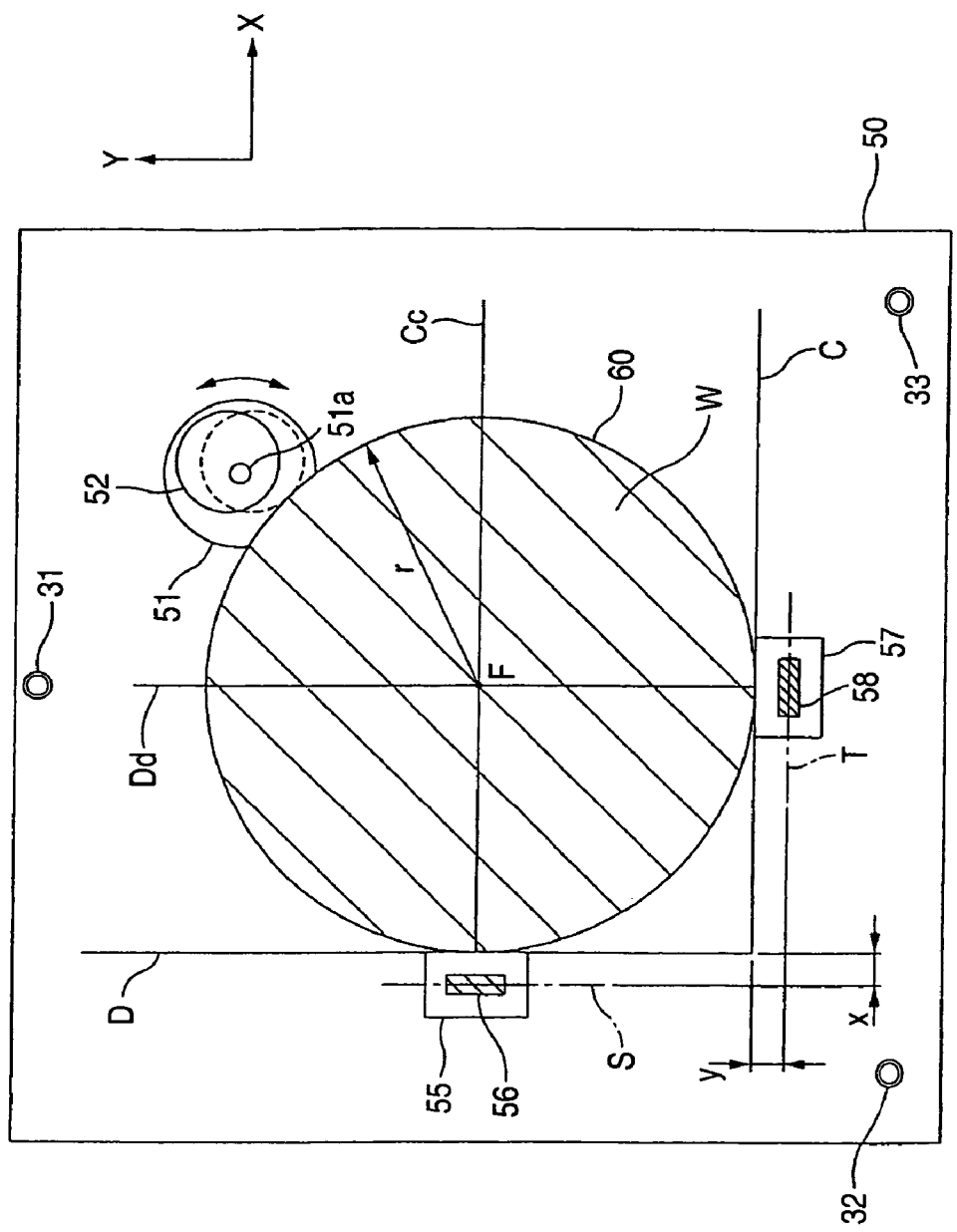
FIG. 4 is a view showing a guide mechanism of a wafer to be inspected.

Further, although according to the above-described embodiment, the object to be inspected is constituted by the glass plate 6 in a quadrangular shape, the object to be inspected is not limited to the shape but may be a wafer 60 to be inspected in a circular shape as shown by, for example, FIG. 4. In the case of the wafer 60 in the circular shape, guides 55 and 57 and marks 56 and 58 are provided on a mounting base 50 as shown by FIG. 4. Further, an eccentric cam 52 and a motor 51 (notation 51a designates a shaft of the motor 51) are provided at positions shown in FIG. 4.

After mounting the wafer 60 on the mounting base 50, the wafer 60 is positioned by the cam 52 and the guides 55 and 57. The control section 13 sets a position offset from the center line S of the mark 56 by the distance of x as a reference line D in X direction and sets a position offset from the center line T of the mark 58 by the distance of y as a reference line C in Y direction to respectively stored to the memory 14 as information for specifying two-dimensional position of the wafer 60. Next, based on a radius r which is dimension data of an outer shape of the wafer 60 inputted from the input section 11a, a line remote from the reference line D by a dimension of r and in parallel with the reference line D is set as a reference line Dd. Similarly, a line remote from the reference line C by the dimension of r and in parallel with the reference line C is set to a reference line Cc. Further, the control section 13 sets a position remote from an intersection F of the reference line Cc and the reference line Dd in the image by the radius r as an edge position and sets a region within the edge as an existing region W of the wafer 60. By a three-dimensional shape provided within an analyzing region, the edge position of the wafer 60 can accurately be known, further, information of the surface shape can be acquired with high accuracy. Further, the three-dimensional shape is related to at which position of the existing region W the three-dimensional shape is disposed and displayed on the monitor 12 by a perspective view, a contour view or the like. Thereby, the flatness of the wafer 60 can be evaluated based on the edge position.

Figure 5:
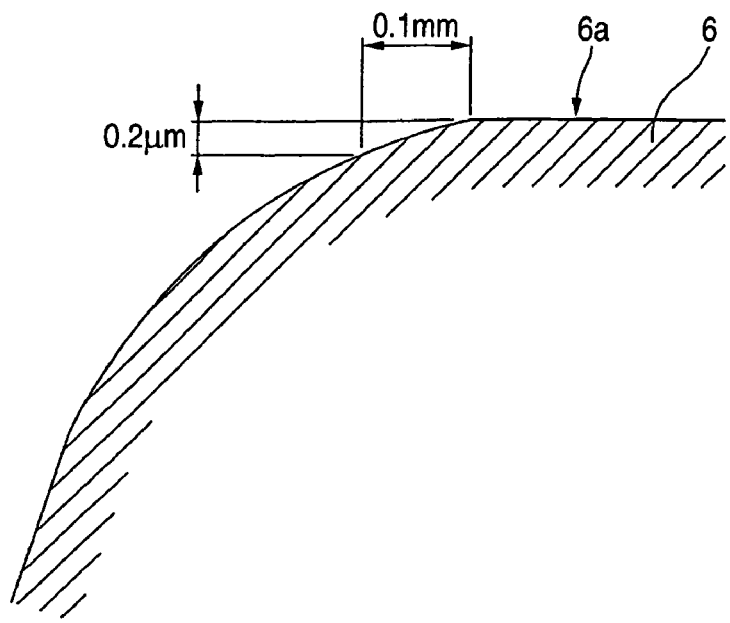
FIG. 5 is a view showing a vicinity of an edge of an object to be inspected.

Further, the flatness is poor at a vicinity of the edge of the object to be inspected by sagging or the like in view of fabrication and is inclined as compared with a central portion as shown by FIG. 5. In this case, when a degree of inclination becomes steep, accuracy of the result of inspection is not reliable.

Figure 6:
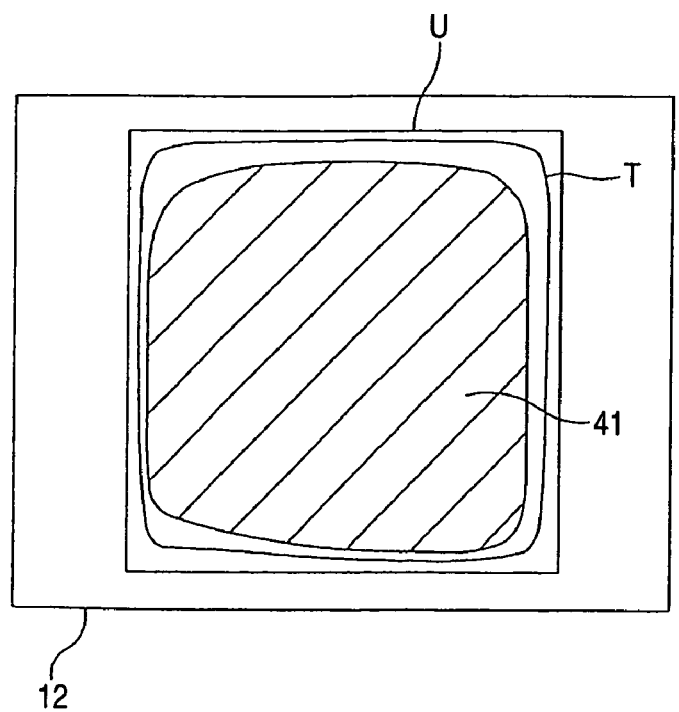
FIG. 6 is a view showing an existing region, an analyzing region and an effective region in which a result of inspection is reliable of a glass plate to be inspected.

Therefore, according to the apparatus, reliability of the result of inspection is determined from the degree of inclination. The control section 13 acquires an amount of inclination (flatness) of a surface from the three-dimensional shape of the surface 6a of the glass plate 6 and determines an effective region where the result of inspection is reliable when an amount of inclination is within a predetermined amount of inclination. For example, as shown by FIG. 5, when a reliable amount of inclination is constituted by up to an inclination of a height difference of a vertical distance of 0.02 μm relative to a horizontal distance of 0.1 mm, the control section 13 determines whether an amount of inclination of each pixel falls within the height difference of the vertical distance of 0.02 μm relative to the horizontal distance of 0.1 m and displays the result on the monitor 12 as shown by FIG. 6. In FIG. 6, notation U designates the existing region of the glass plate 6, notation T designates the analyzing region where the image of the interference fringe is obtained and numeral 41 designates the effective region where the result of inspection is reliable. According to a surface inspecting apparatus of a related art, the edge of the object to be inspected cannot be detected and therefore, it cannot be specified at which position the effective region in which the result of inspection is reliable is disposed. According to the apparatus, the edges of the object to be inspected can be detected as described above and therefore, it can visually be grasped at which position the effective region in which the result of inspection is reliable is disposed.

Further, although according to the above-described embodiment, there are provided two of the guides 27 and 29 for matching the edge 6c of the glass plate 6 to the reference position in Y direction, a single one thereof will do. However, by providing a plurality of guides in one direction, positional shift of the glass plate 6 is not brought about and the center line can further accurately be acquired. Further, contrary, there may be provided two of guides of matching the edge 6b of the glass plate 6 to the reference position in X direction. Further, it is preferable that a length to some degree is ded to the length of the guide (mark). In this way, positions, a number of pieces, shapes and the like of the guides can pertinently be selected to match to the outer shape of the object to be inspected. Further, positions, a number of pieces and the like of the eccentric cams can pertinently be selected to much to the outer shape of the object to be inspected.

As has been explained above, according to the invention, the surface shape can be inspected with high accuracy by accurately grasping the edge positions of the object to be inspected.

What is claimed is:

1. A surface inspecting apparatus for inspecting a shape of a surface to be inspected of an object to be inspected comprising:
    a mounting base on which the object is mounted;
    positioning means for positioning the object to an inspecting position on the mounting base;
    a memory which stores position specifying information for specifying a two-dimensional position of the object when the object is positioned;
    inputting means for inputting an outer shape data of the object; and
    edge position determining means for determining an edge position of the object based on the stored position specifying information and the inputted outer shape data.

2. The surface inspecting apparatus according to claim 1, wherein the positioning means includes a guide member attached to the mounting base, with which the object is positioned to the inspecting position by being brought into contact with an edge of the object, and
    wherein the memory stores the position specifying information for specifying the two-dimensional position of the object when the edge of the object is brought into contact with the guide member.

3. The surface inspecting apparatus according to claim 2, further comprising:
    an image taking unit which takes an image of a mark provided for a predetermined position with respect to the guide member; and
    reference position determining means for determining a reference position by processing the taken image including the image of the mark;
    wherein the memory stores the determined reference position information as the position specifying information.

4. The surface inspecting apparatus according to claim 3, wherein the image taking unit takes an image of an interference fringe formed by the inspected surface of the positioned object and a reference surface.

5. The surface inspecting apparatus according to claim 1, further comprising:
    existing region determining means for determining an existing region of the object based on the determined edge position.

6. The surface inspecting apparatus according to claim 1, further comprising:
    analyzing means for determining a three-dimensional shape of the surface of the object; and
    outputting means for outputting information of a positional relationship between the determined edge position and an analyzing region of the analyzing means.

7. The surface inspecting apparatus according to claim 1, further comprising:
    analyzing means for determining a three-dimensional shape of the surface of the object;
    effective region determining means for determining an effective region achieving a predetermined inspection accuracy from a result of analysis by the analyzing means; and
    outputting means for outputting information of a positional relationship between the determined edge position and the determined effective region.

8. A surface inspecting apparatus for inspecting a shape of a surface to be inspected of an object to be inspected comprising:
    a mounting base on which the object is mounted;
    a guide member with which the object is positioned to an inspecting position on the mounting base by being brought into contact with an edge of the object;
    a mark provided for a predetermined position with respect to the guide member;
    an image taking unit which takes an image of an interference fringe formed by the inspected surface of the positioned object and a reference surface, and an image of the mark;
    analyzing means for determining a three-dimensional shape of the surface of the object based on the taken image of the interference fringe;
    reference position determining means for determining a reference position by processing the taken image including the image of the mark;
    inputting means for inputting an outer shape data of the object; and
    edge position determining means for determining an edge position of the object based on the determined reference position information and the inputted outer shape data.

9. The surface inspecting apparatus according to claim 8, further comprising:
    outputting means for outputting information on a positional relationship between the determined edge position and an analyzing region of the analyzing means.

10. The surface inspecting apparatus according to claim 8, further comprising:
    effective region determining means for determining an effective region achieving a predetermined inspection accuracy from a result of analysis by the analyzing means; and
    outputting means for outputting information of a positional relationship between the determined edge position and the determined effective region.

* * * * *